United States Patent [19]

Fagin et al.

[11] Patent Number: 4,782,740
[45] Date of Patent: Nov. 8, 1988

[54] PISTON AND SHAFT ASSEMBLY FOR AN END-OF-CAR CUSHIONING UNIT

[75] Inventors: Donald R. Fagin, LaGrange Park; Howard E. Tonn, Lombard, both of Ill.; Clebern W. Sigley, Orange Park, Fla.

[73] Assignee: Co-Ordinated Railway Services, Inc., Downers Grove, Ill.

[21] Appl. No.: 74,627

[22] Filed: Jul. 17, 1987

Related U.S. Application Data

[63] Continuation of Ser. No. 867,761, May 28, 1986, Pat. No. 4,719,686.

[51] Int. Cl.⁴ .......................... B23P 11/02; F16J 1/00
[52] U.S. Cl. .................... 92/255; 29/402.08; 29/402.03; 29/426.4; 29/426.5; 188/323.22
[58] Field of Search ............ 29/156.5 R, 402.01, 29/402.02, 402.03, 402.08, 402.11, 426.1, 426.4, 426.5; 74/579 R; 92/168, 255; 123/193 R, 193 CP, 193 P; 188/322.22; 213/43; 604/222

[56] References Cited

U.S. PATENT DOCUMENTS

| 2,752,668 | 7/1895 | Sheen | 29/402.11 |
|---|---|---|---|
| 3,568,858 | 3/1971 | Levy | 213/43 |
| 3,589,827 | 6/1971 | Levy | 213/43 |
| 3,725,994 | 4/1973 | Webster | 29/447 |
| 3,752,329 | 8/1973 | Levy et al. | 213/43 |
| 4,376,335 | 3/1983 | Furuhama et al. | 29/447 |
| 4,419,804 | 12/1983 | Axthammer | 29/434 |
| 4,501,192 | 2/1985 | Krödel | 29/156.5 R |
| 4,573,280 | 3/1986 | Miller et al. | 29/402.08 |

*Primary Examiner*—Timothy V. Eley
*Attorney, Agent, or Firm*—Kinzer, Plyer, Dorn, McEachran & Jambor

[57] ABSTRACT

A method of repairing an end-of-car cushioning device for railroad cars is disclosed. The cushioning device is of the type having a piston and a shaft connected to the piston. In such devices, the shaft may become damaged with wear. In the disclosed method of repair, the old piston and shaft are removed from the cushioning device. The old shaft is substantially removed from the piston. The piston's true center is found, and a bore is cut through it. The bore is threaded, and an angled chamfer is cut in one end of the bore. A new shaft is provided with a threaded portion, the threads being adapted to mate with the threads of the bore. The shaft also has an angled chamfer adapted to mate with the bore's chamfer. The new shaft is connected to the old piston so that the threads engage and the chamfers abut.

5 Claims, 2 Drawing Sheets

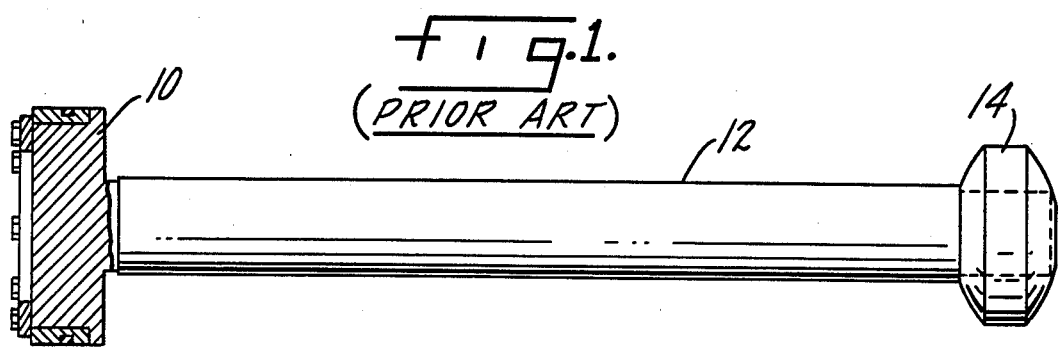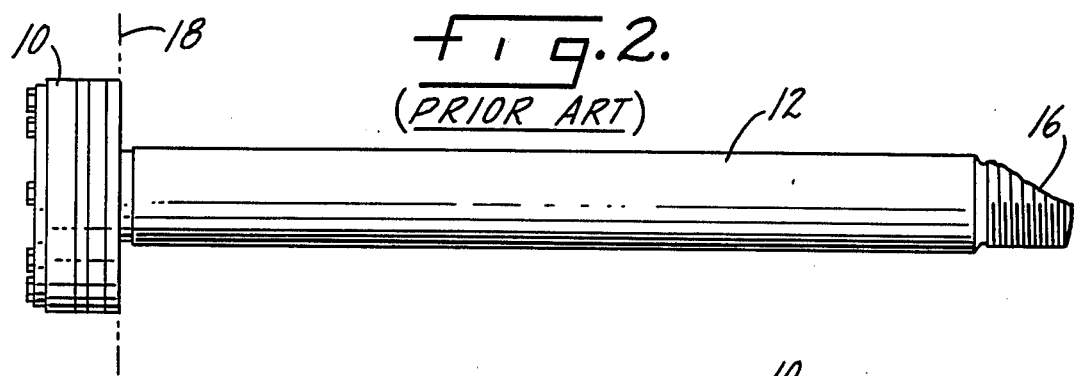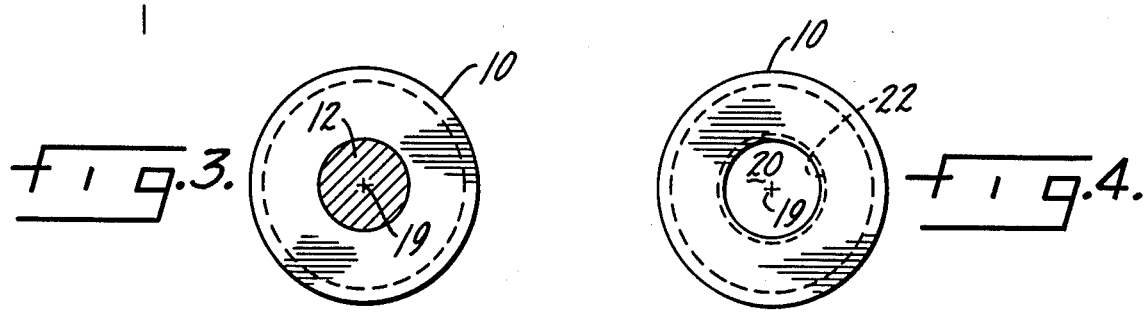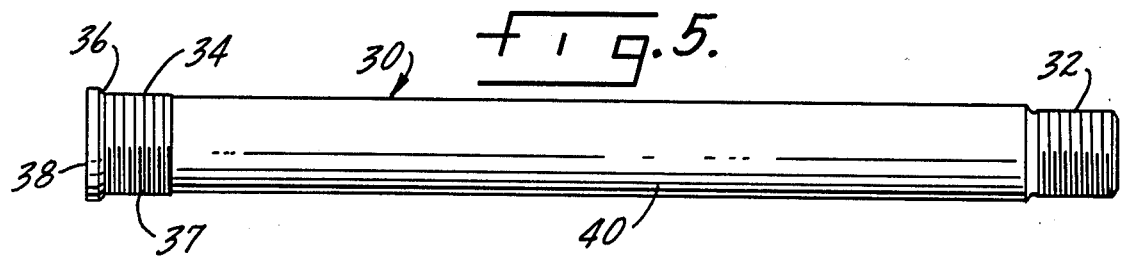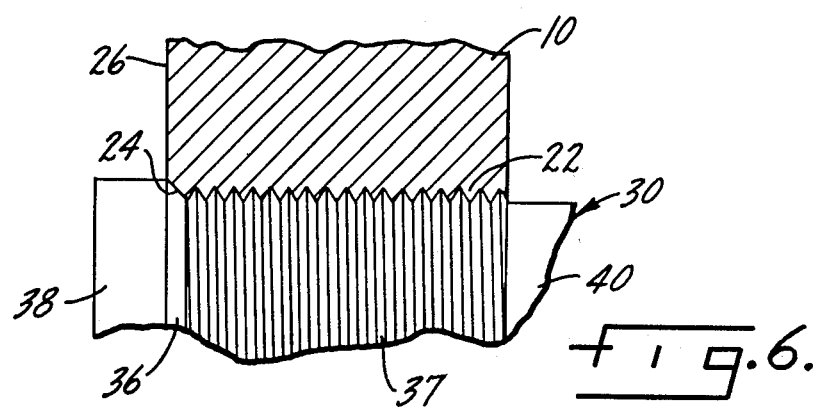

PISTON AND SHAFT ASSEMBLY FOR AN END-OF-CAR CUSHIONING UNIT

This is a continuation of application Ser. No. 876,761 filed May 28, 1986, now U.S. Pat. No. 4,719,686.

BACKGROUND OF THE INVENTION

This invention relates to a method of repairing end-of-car hydraulic cushioning devices used on railroad cars. More particularly, the present invention is directed to replacing broken or cracked shafts used in such cushioning devices.

End-of-car hydraulic cushioning devices have been used on freight and passenger railroad cars to dampen train action buff and draft forces. Such cushioning devices are known in the art, as represented by U.S. Pat. Nos. 3,589,527 and 3,752,329. The cushioning devices disclosed in these patents, as well as other cushioning devices in use today, utilize a one-piece piston and shaft arrangement to transfer outside coupling forces through a hydraulic fluid-filled housing. As the piston and shaft move through the housing, they displace hydraulic fluid. The fluid is metered through valves and other orifices in the housing to absorb energy.

Each end-of-car hydraulic cushioning device is designed to fit in a center sill pocket at an end of the railroad car. The shaft includes an end normally provided with a spherical bearing which connects to the car body. The housing is connected to the coupler and is slideable within the sill pocket. The housing has metal stops which engage similar limiting stops fixed on the inside of the sill. These engaging stops limit the length of travel of the housing relative to the piston and shaft as buff and draft forces act upon the railroad car coupler, extending and compressing the cushioning device in its center sill pocket location.

Examination and testing of used cushioning devices and center sill pockets have shown that wear experienced in the pockets may impair the functioning of the limit stops. With such wear, as outside buff and draft forces act upon the shaft and piston, the piston will contact other internal parts of the cushioning device, resulting in stress at the connection of the piston and shaft, and at the connection of the shaft and spherical bearing. Depending on the load, the shaft may crack at either connection, eventually leading to complete failure of the device. Where these connections are achieved through heat shrinking or welding, the shaft and piston or bearing may separate, further damaging other internal critical metering features, so that the cushioning device is virtually irreparable.

SUMMARY OF THE INVENTION

When shaft failures occur within an end-of-car hydraulic cushioning device, which uses a one-piece, friction welded, heat shrink welded or other similar connection between the shaft and piston, the failure generally occurs to the shaft, which cannot be reused. The original piston can, however, usually be reused with a replacement shaft. If the original piston is reuseable, the method of the present invention may be used to repair the device.

To repair the end-of-car hydraulic cushioning device, the old piston and shaft are removed from the device. The old shaft is then removed from the piston. The piston's true center is found, and a bore is cut through the true center. Threads are then cut in the bore, and an angled chamfer is cut at one end of the bore. A new shaft is provided, the new shaft having a threaded portion at a predetermined position along its length. The threads are adapted to mate with the threads of the bore. The new shaft also has an angled chamfer at one end of its threaded portion, the chamfer being adapted to mate with the chamfer of the bore. The new shaft is then connected to the piston by screwing the threaded sections together. To ensure a strong connection, a thread lock adhesive may be used in this connection. The new shaft is assembled into a housing and connected to a spherical bearing, and the repaired assembly may be reused for cushioning of railroad car couplers.

BRIEF DESCRIPTION OF THE DRAWINGS

FIG. 1 is a side view, in partial cross section, of a typical prior art piston, shaft and bearing assembly used in end-of-car hydraulic cushioning devices.

FIG. 2 is a side view of a damaged prior art assembly.

FIG. 3 is an end view of the piston after the damaged shaft has been removed.

FIG. 4 is an end view of the piston of FIG. 3 after some of the repair steps have been completed.

FIG. 5 is a side view of a new shaft.

FIG. 6 is an enlarged partial side view, in cross section, of a repaired piston and shaft.

DETAILED DESCRIPTION OF THE ILLUSTRATED EMBODIMENT

In the accompanying drawings there is illustrated a piston and shaft assembly for use in an end-of-car hydraulic cushioning device for use on railroad cars. Also illustrated is a damaged piston-shaft assembly, such as would occur after the cushioning device has worn. As provided by the method of the present invention, this damaged shaft may be removed and replaced with a new shaft. When subjected to tension tests, the repaired piston and shaft assemblies exhibit sufficient strength to withstand tensile loads of 900 klbs. (900,000 pounds-force) without disengagement of the piston and shaft.

Referring to FIG. 1, a typical prior art piston 10, shaft 12 and spherical bearing 14 assembly is shown. This assembly fits within an end-of-car hydraulic cushioning device, such as that described in U.S. Pat. No. 3,589,527 to Seay, et al., the disclosure of which is incorporated by reference herein.

Figure 7:
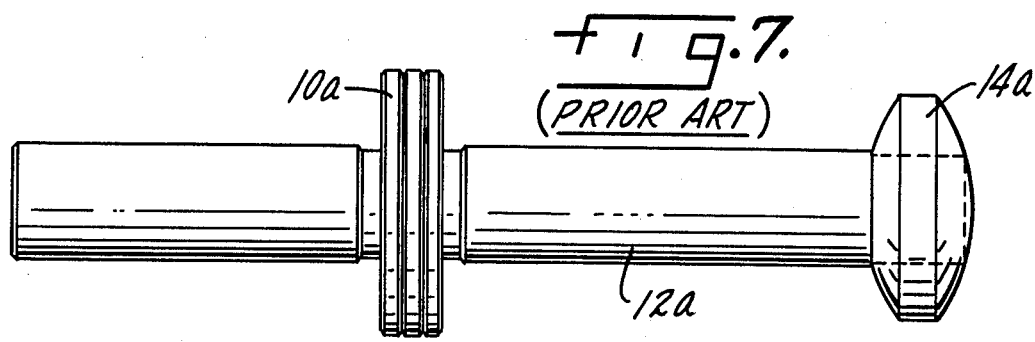
FIG. 7 is a side view of another type of prior art piston, shaft, and bearing assembly.

In this embodiment, the piston 10 and bearing 14 are disposed at opposite ends of the shaft 12. Another typical prior art assembly is illustrated in FIG. 7. This assembly also includes a piston 10a, shaft 12a, and spherical bearing 14a. However, in this embodiment, the piston 10a is disposed along the length of the shaft 12a, rather than at an end. Such an assembly fits within an end-of-car hydraulic cushioning unit such as that disclosed in U.S. Pat. No. 3,752,329 to Seay, et al., the disclosure of which is incorporated by reference herein.

In both of these typical prior art assemblies, the pistons 10, 10a, are usually welded to the shafts 12, 12a, such as by inertial friction welding or heat shrink welding. As the hydraulic cushioning device wears, stresses act upon the connections between the shafts 12, 12a and the pistons 10, 10a and the bearings 14, 14a. These stresses may result in failure of the shaft, such as, for example, a break 16 in the shaft at the connection with the spherical bearing, as shown in FIG. 2. It should be understood that these stresses may cause breaks and cracks elsewhere along the length of the shaft, such as at the connection with the piston.

When such a break or crack occurs, it is necessary to replace or repair the assembly or the entire cushioning device. By the method of the present invention, the piston-shaft bearing assembly may be effectively repaired and then replaced in the cushioning device.

To practice the method of the present invention, the piston 10 and shaft 12 assembly must first be removed from the cushioning device. The length of the old shaft 12 is then substantially removed from the piston 10, as by cutting along line 18 of FIG. 2. The piston 10 is positioned in a lathe or other fixture designed to determine the true center 19 of the piston 10. After the true center 19 has been determined, a bore 20 is cut in the piston at its true center through its axial length. This boring removes any remaining shaft material.

As shown in FIG. 4, threads 22 are then cut into the wall so the bore 20, by, for example, single pointing, to a predetermined number of threads per inch and thread class. In the illustrated embodiment, a 3.305 inch diameter bore and eight threads per inch, thread class 3 or better are provided. A chamfer 24 is also cut at one end of the bore 20, preferably on the outside face 26 of the piston. In the illustrated embodiment, a ⅛ inch chamfer is cut at a 45° angle.

As shown in FIG. 5, a new shaft 30 is provided. The new shaft has a first threaded end 32, adapted for connection to the spherical bearing 14. At the opposite end 34, the shaft is adapted to mate with the chamfer 24 and threads 20 of the piston 10. Accordingly, in the illustrated embodiment, this end 34 of the new shaft 30 has a ⅛ inch, 45° chamfer 36 and a threaded portion 37, threaded at eight threads per inch. Integral provided. The diameter of the stop 38 is greater than that of the bore 20; in the illustrated embodiment, the diameter of the stop 38 is 3.500 inches. The diameter of the central length 40 of the new shaft is less than that of the bore 20, so that the piston 10 may be slipped onto the shaft from the first threaded end 32.

As seen in FIG. 5, the stop 38 is positioned such that chamfer 36, which engages chamfer 24 of piston 10, physically limits further movement of piston 10 along shaft 12 in a direction away from threaded end 32. Thus, the stop 38 positions the piston 10 relative to spherical bearing 14 and also bears a portion of the force when the shaft is exposed to draft or tensile loads. It is contemplated that such loads are more severe than buff or compressive loads. In this latter load condition, the threaded connection between the piston and shaft transmit the force loads.

Providing a new shaft for an existing piston makes possible another improvement. The shaft can be made from ½ inch to three inches longer than the original shaft. This permits greater tolerance to wear within the sill pocket and reduces the possibility that a piston will "bottom out" within its cylinder in the cushioning device. This reduces the cause of shaft failures by reducing the possibility of associated impact forces upon the piston and shaft.

In the method of the present invention, the new shaft 30 is connected to the piston 10. As indicated, the piston is slipped onto the first threaded end 32 of the shaft through the bore 20, slid along the length of the shaft, and then screwed onto the threaded portion 37 of the new shaft. When so connected, the mating chamfers 24, 36 abut each other, as shown in FIG. 6. In the connection between the piston and the new shaft, a thread lock adhesive should be used. An acceptable thread lock adhesive is "Loctite 271", manufactured by the Loctite Corporation of Newington, Connecticut. The first threaded end 32 of the new shaft may then be connected to the spherical bearing 14 and the repaired assembly replaced in the cushioning devices.

Figure 8:
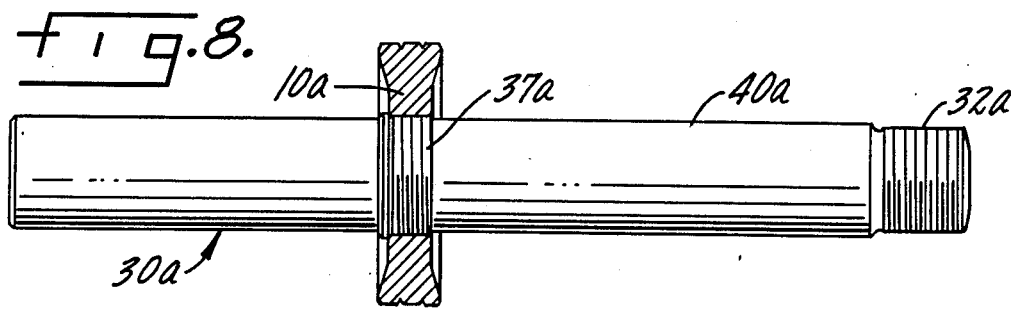
FIG. 8 is a side view, in cross section, of a repaired piston and shaft, of the type shown in FIG. 7.
Figure 9:
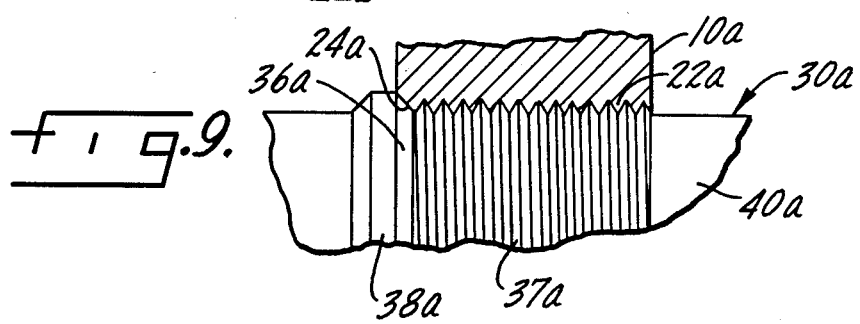
FIG. 9 is an enlarged partial side view, in cross section of the piston and shaft of FIG. 8.

Referring now to FIGS. 7-9, the method of the present invention may also be successfully employed in repairing piston-shaft combinations of the type where the piston 10a is disposed along the length of the shaft 12a. In this embodiment, as shown in FIGS. 8 and 9, the new shaft 30a has a threaded portion 37a and has a 45° chamfer 36a and stop 38a along its central length 40a. The stop 38a is located at a predetermined distance along shaft 30a to position piston 10a with respect to a spherical bearing which is attached to threaded end 16a.

The piston 10a is cut, bored and threaded as previously described to provide a bore 20a, with threads 22a, and a chamfer 24a at one end to mate with the chamfer 36a of the new shaft 30a. The remaining steps of the repair method are the same as that described hereinabove.

Figure 10:
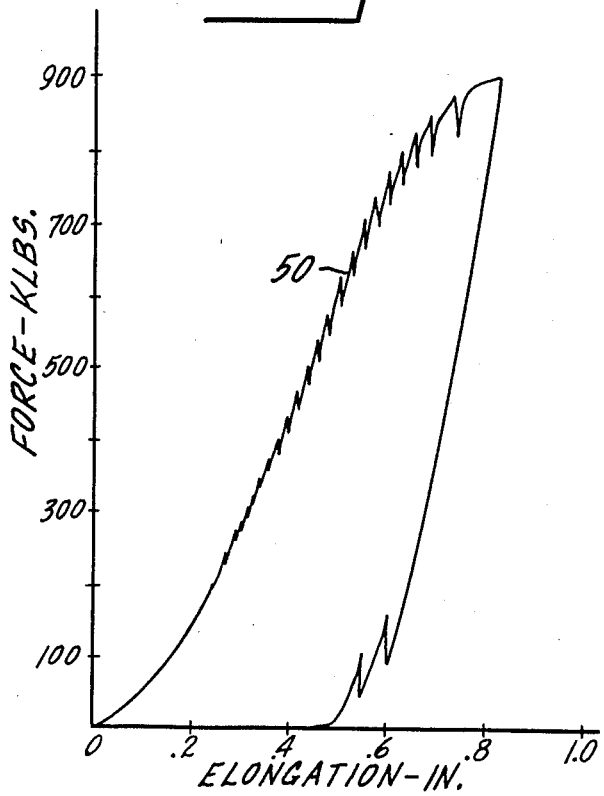
FIG. 10 is a graphic illustration of a tension test performed on the repaired assembly of FIG. 6.
Figure 11:
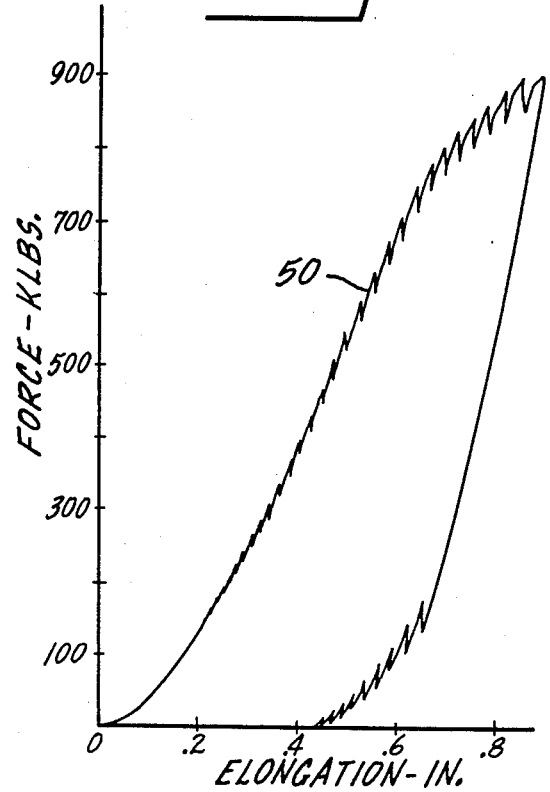
FIG. 11 is a graphic illustration of a tension test performed on the repaired assembly of FIGS. 8 and 9.

Piston and shaft assemblies repaired by the method of the present invention have been tested on a 1,000 klbs. tension test machine. This testing method applies tensile loads similar to train action draft loads which the repaired devices would experience in use. The graphic results of two of these tests are illustrated in FIGS. 10 and 11. FIG. 10 illustrates the test results for the type of repaired piston-shaft assembly illustrated in FIG. 6. FIG. 11 illustrates the test results for the type of repaired piston-shaft assembly illustrated in FIGS. 8 and 9. In both of the tested combinations, a thread lock adhesive had been used. In both FIGS. 10 and 11, the vertical axis represents tension, in klbs. (1,000 lbs.), and the horizontal axis represents elongation, in inches. The jagged ascending lines 50 in both graphs were due to sensitivity of the test equipment rather than yielding of the repaired piston-shaft assembly.

In both of the illustrated tests, the repaired piston-shaft assemblies bore loads of 900 klbs. (900,000 pounds-force) without failure. In FIG. 10, at a 900 klb. load, the assembly was elongated by 0.86 inches. In FIG. 11, at a 900 klb. load, the assembly was elongated by 0.90 inches. The Association of American Railroads minimum failure requirement for an E-60 coupler knuckle is 600 klbs. (600,000 pounds-force). The design load for many cushion pocket sill stops is 350 klbs. (350,000 pounds-force). Therefore, the test data would indicate that either coupler knuckles or sill stops would fail before a repaired piston-shaft assembly would separate, with the same attachment methods of those included in this test procedure.

Although the invention has been described with respect to the two illustrated embodiments, the invention is not limited to these embodiments. Additional modifications and/or additions may be included by those skilled in the art without departing from the scope of the invention as defined by the claims.

We claim:

1. A piston and shaft assembly for an end-of-car cushioning device, comprising:
   a shaft having a central length of a first diameter, a threaded portion of a second outside diameter larger than the first diameter, and a stop of a third diameter larger than the second diameter;
   a piston having a bore through its center of a diameter greater than the diameter of the central length of the shaft, threads formed on the surface of the bore, and a stop formed in one end of the bore, adapted to mate with the stop of the shaft, the threads being adapted to mate with the threads of the shaft such that the shaft threads provide a positive abutment to axial movement of the piston along the shaft in one direction while the shaft stop provides a positive abutment to axial movement of the piston along the shaft in the other direction.

2. The assembly of claim 1 wherein the shaft stop includes an angled chamfer at one end of the threaded portion and the piston stop includes a similar chamber at one end of its threaded portion.

3. The assembly of claim 2 wherein the chamfers are angled at an angle of about 45 degrees.

4. The assembly of claim 1 wherein the piston and shaft assembly includes a spherical bearing and the shaft includes a means for connecting the shaft to the spherical bearing.

5. The assembly of claim 1 wherein the shaft and piston stops are located such that the shaft stop receives loads transferred between said piston and shaft when said shaft is subjected to tensile forces.

* * * * *